US008842269B2

(12) United States Patent
Blankers

(10) Patent No.: US 8,842,269 B2
(45) Date of Patent: Sep. 23, 2014

(54) BEAM DEFLECTION SENSOR

(76) Inventor: Nicolai Taylor Blankers, Chanhassen, MN (US)

(*) Notice: Subject to any disclaimer, the term of this patent is extended or adjusted under 35 U.S.C. 154(b) by 419 days.

(21) Appl. No.: 12/930,263

(22) Filed: Jan. 3, 2011

(65) Prior Publication Data

US 2012/0170028 A1 Jul. 5, 2012

(51) Int. Cl.
G01C 1/00 (2006.01)
G01C 1/06 (2006.01)
G01B 1/00 (2006.01)
G01N 21/00 (2006.01)
G01B 11/00 (2006.01)
G01B 11/14 (2006.01)
G01B 11/16 (2006.01)

(52) U.S. Cl.
CPC ..................... G01B 11/16 (2013.01)
USPC ........... 356/138; 356/153; 356/399; 356/400; 356/237.1; 356/237.2; 356/237.3; 356/237.4; 356/237.5; 356/614; 356/615; 356/139; 356/139.06; 356/140; 356/150

(58) Field of Classification Search
CPC ...... G01B 11/16; G01B 11/026; G01B 11/22; G01B 11/24; G01C 19/668; G01C 19/665; A61B 3/0008
USPC ............ 356/614–623, 32, 34, 138, 153, 356/399–400, 237.1–237.5, 139–152.3
See application file for complete search history.

(56) References Cited

U.S. PATENT DOCUMENTS

| 4,662,752 | A | * | 5/1987 | Tucker et al. | 356/614 |
| 4,792,228 | A | * | 12/1988 | Haffner | 356/138 |
| 4,889,425 | A | * | 12/1989 | Edwards et al. | 356/141.3 |
| 5,307,368 | A | * | 4/1994 | Hamar | 372/107 |
| 5,929,984 | A | * | 7/1999 | Hamar | 356/146 |
| 7,242,483 | B2 | * | 7/2007 | Liu et al. | 356/601 |
| 7,901,115 | B2 | * | 3/2011 | Chien | 362/397 |
| 8,186,642 | B2 | * | 5/2012 | Weiss-Vons | 248/683 |
| 8,325,333 | B2 | * | 12/2012 | Jywe et al. | 356/139.1 |
| 2005/0270545 | A1 | * | 12/2005 | Taffet | 356/614 |
| 2011/0235053 | A1 | * | 9/2011 | Campagna | 356/614 |

FOREIGN PATENT DOCUMENTS

DE 3942922 * 6/1991 ............... F41G 1/54

* cited by examiner

Primary Examiner — Tarifur Chowdhury
Assistant Examiner — Sunghee Gray

(57) ABSTRACT

A beam deflection device including an aluminum disc containing a plurality of lasers, each laser projecting a laser beam substantially along one of the 'X', 'Y', and 'Z' axes of a structural beam to which the device is attached. Wiring is attached to each of the plurality of lasers to provide power and transmit data. Passageways are provided in the solid disc to route the wiring to the exterior. A suction cup on a surface of the device allows it to be attached to the beam by pressing the device against a flat surface area of the beam.

16 Claims, 2 Drawing Sheets

BEAM DEFLECTION SENSOR

TECHNICAL FIELD

The beam deflection device pertains to the industries of Mechanical and Structural Engineering, Building Design, and in some cases Materials Testing. More specifically, it relates to sensors and devices used to measure the force required to break a piece of material or cause deflection in the same.

BACKGROUND

It is a constant concern in the structural engineering and construction industries that unforeseen creep deformities (or causes of such deformities) in construction materials will result in an unexpected progressive failure of the structure. Creep deformities exist as natural molecular imperfections in materials and rapid modernization has led to unforeseen causes of creep failure with catastrophic consequences.

SUMMARY

The embodiments described herein possess numerous advantages over existing sensors and/or devices used to determine beam deflection. Unlike most conventional sensors and/or devices, such as those used to determine error in a factory actuation system—a printed circuit board is not housed within the beam deflection device, substantially reducing the risk of damage by airborne particles, damage by impact or vibration, cost of maintenance, and cost of manufacture. Instead, the embodiments described herein utilize wiring to supply electricity to the lasers and wiring to provide continuous feedback to a monitoring computer, where software interprets the feedback, which is based on the length of each laser beam, to determine deflection of the beam. The computer compares deflection in the beam with the programmed maximum safe amount of deflection to determine if the beam has exceeded its point of safe deflection.

The beam deflection device is advantageous for use in Materials Testing, as forces inflicted on test materials commonly result in high impact, resonance, and airborne particles. Therefore, with the use of conventional sensors and/or devices, costly scaled casings and carefully controlled environments must be maintained to prevent damage to said conventional sensors and/or devices. The beam deflection device eliminates the need for such expense. Furthermore, it will improve the accuracy while reducing the cost of deflection measurement in materials tests—the amount of force which must be inflicted on the test material to determine its safe level of deflection would be substantially less, since measurement information from the device is constant.

In relation to the Materials Testing industry, measuring the elasticity, stiffness, or other qualities of a test material often involves destructive testing—for example the Charpy Impact Test (which involves breaking a piece of the test material with a pendulum axe). Such destructive testing is sometimes dangerous and usually wastes resources like materials and energy. Extensive time-and-resource-consuming safety precautions must be taken when working with such great forces. The beam deflection device precisely measures deflection in any material to which it is attached and provides a continuous information feed of such deflection. The necessary amount of force inflicted on the test material to determine its safe level of deflection would be substantially less. Due to its precision, the beam deflection device will also provide more detailed information regarding permanent damage and/or bending in the test material after the initial testing.

The beam deflection device is simple, small, and easy to use by people with no training in the industry. Installation is immediate and does not require the use of permanent attachment methods—the device can be removed from the beam simply by pulling it off. This is a huge advantage over existing sensors and/or devices used to calculate and/or determine beam deflection, most of which require lengthy and permanent installations.

The beam deflection device is intended to serve as an early warning system for material weaknesses and will limit casualties caused by the unexpected creep failure of structural supports. The beam deflection device works by projecting laser beams along the "X", "Y", and "Z" axes of the structural beam to which it is attached and relaying this information to a computer which calculates deflection in the beam.

DETAILED DESCRIPTION

Figure 1:
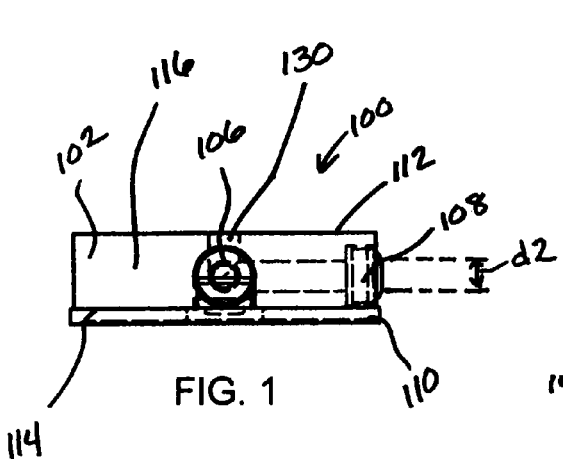
FIG. 1 is a side view of the device, according to an embodiment.
Figure 2:
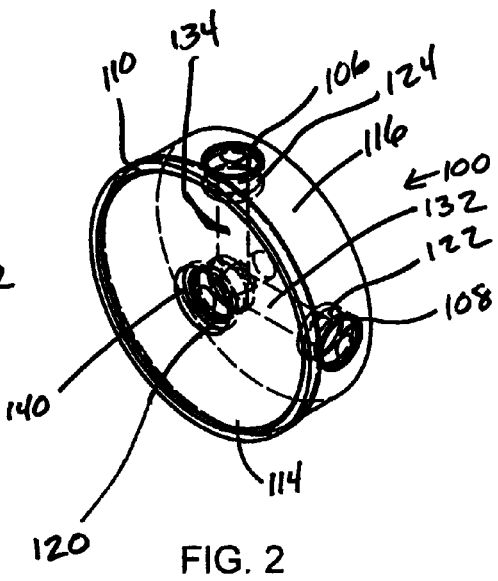
FIG. 2 is an isometric view of the device, according to an embodiment.
Figure 3:
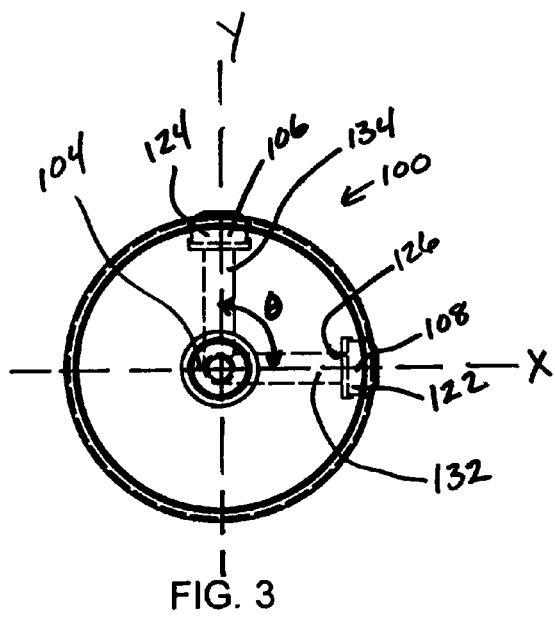
FIG. 3 is a bottom view of the device, according to an embodiment.
Figure 4:
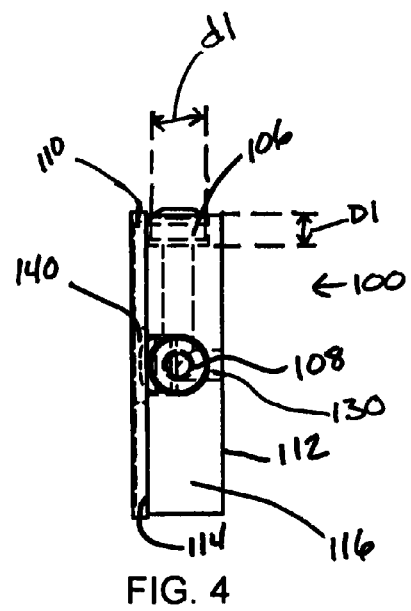
FIG. 4 is a side view of the device, according to an embodiment.
Figure 5:
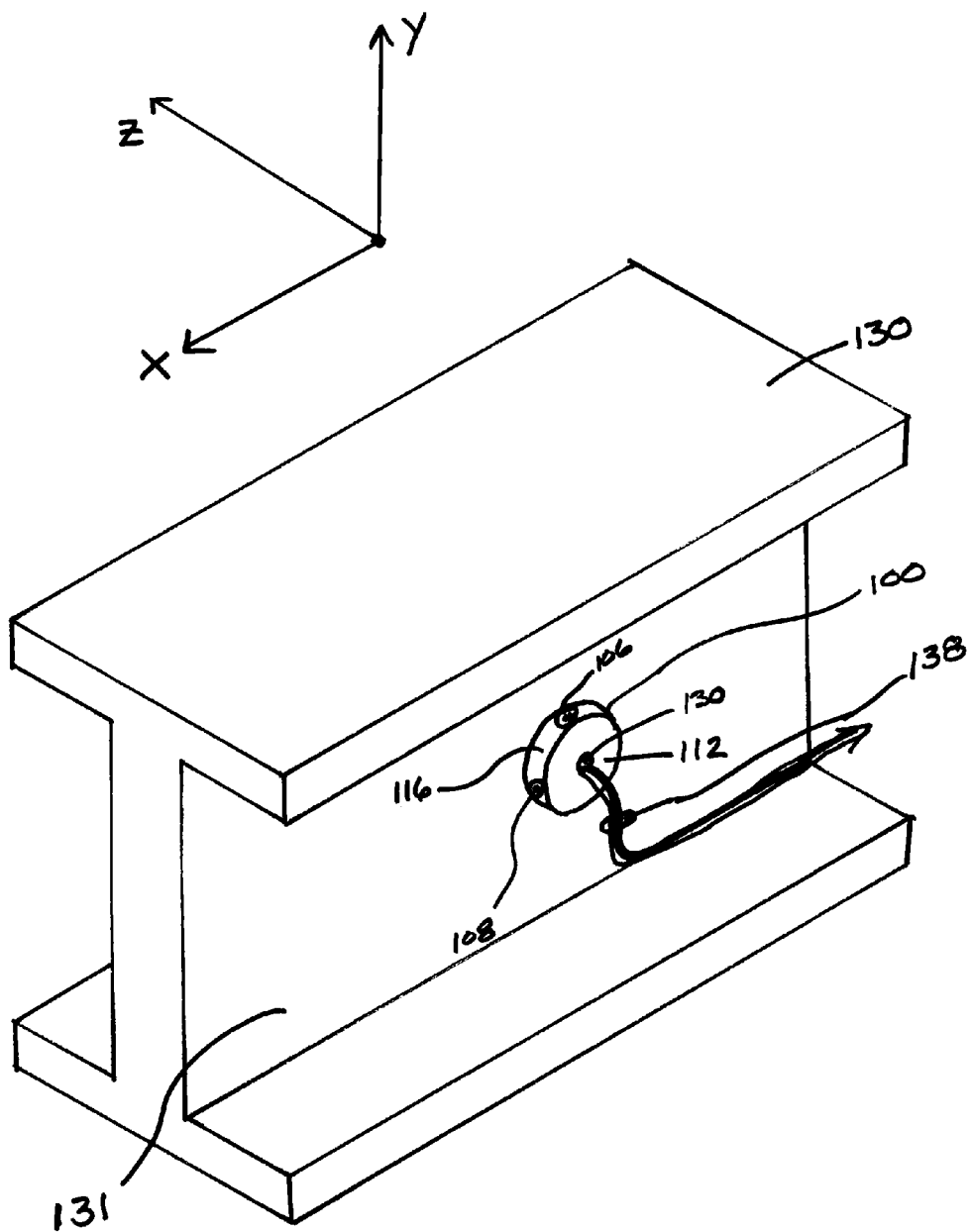
FIG. 5 is a view of the device attached to an I-beam, according to an embodiment.

As depicted in the embodiments of FIGS. 1-5, beam deflection device 100 ("device") comprises an aluminum disc 102 which houses three lasers 104, 106, 108 and wiring 138 to supply power to lasers 104, 106, 108 and provide feedback to the computer. The laser beam of each laser 104, 106, 108 can be projected, respectively, along the 'X', 'Y', and 'Z' axes of a structural beam 130 to which device 100 is removably attached. In another embodiment, the disc 102 houses two lasers 106, 108, the laser beam of each laser 106, 108 can be projected, respectively, along the 'X' and 'Y' axes of a structural beam 130. In an embodiment, device 100 comprises a vacuum attachment system 110 to removably attach device 100 to beam 130 by placing vacuum attachment system 110 onto a flat surface 131 of beam 130 and applying a force on device 100 forcing air from the vacuum attachment system 110. In another embodiment, device 100 can be attached to the beam with adhesives (not shown). When device 100 is attached to beam 130 structure, center laser 104 projects a laser beam substantially along the 'Z' axis-towards beam 130—and edge lasers 106, 108 each project a laser beam substantially parallel to the adjacent edges of the beam—laser 108 in the 'X' direction and laser 106 in the 'Y' direction.

Device 100 comprises an aluminum disc 102 having a thickness, disc 102 comprising a first side 112, a second side 114, and a circumferential edge 116. The disc 102 defining a first cavity 120 disposed on the second side 14 of the disc 102 and centered on the 'Z' axis of the disc 102. The disc 102 further defining a second cavity 122 and a third cavity 124 where the second cavity 122 is disposed on the circumferential edge 116 and centered on the 'X' axis and the third cavity 124 is disposed on the circumferential edge 116 and centered on the 'Y' axis such that the second cavity 122 and third cavity 124 are offset 90 degrees θ. Cavities 120, 122, 124 comprise interior bottom surfaces 126, and depths D1 and diameters d1.

Cavities 120, 122, 124 are dimensioned to accept laser 104, 106, 108 so that laser face is adjacent circumferential edge 116. In an embodiment, disk is approximately one inch in diameter and 0.25 inches thick. In an embodiment, cavities are approximately 0.2 inches in diameter.

In an embodiment, the disc 102 further defines passageways 130, 132, 134. Passageway 130 initiates at bottom surface 126 of cavity 120 and extends to first side 112. In an embodiment, passageway 130, 132, 134 is smaller in diameter d2 than its respective cavity 120, 122, 124. In an embodiment, passageway 130, 132, 134 is approximately 0.1 inches in diameter d2. Passageways 132, 134 each initiate at bottom surface 126 of cavities 122, 124, respectively, and each extend to 'Z' axis of disc 102 such that passageways 130, 132, 134 are in fluid communication with each other at 'Z' axis. Passageways 130, 132, 134 provide pathways for wiring 138 to supply power to lasers 104, 106, 108 and to transmit information to a monitoring computer (not shown) that calculates deflection in the beam.

In an embodiment, lasers 104, 106, 108 are provided in aluminum casings that correspond to cavities 120, 122, 124. Lasers 104, 106, 108 are fixedly mounted in casings, and casings are fixedly attached in cavities 120, 122, 124 with wiring 138 traversing passageways 130, 132, 134, respectively, and wiring 138 of lasers 106, 108 each continuing to follow passageway 130 so that all of the wiring 138 emerges from disc 102 on first side 112.

Affixed to second side 114 of disc 102 is vacuum attachment system 110 or suction cup. Vacuum attachment system 110 is approximately the same diameter as disc 102 and defines a hole 140 approximately the same diameter as the laser in the center.

The device 100 is simple and inexpensive compared to existing sensors and other devices used to measure beam deflection. Conventional sensors and devices can house printed circuit boards within the device and are therefore more complicated to manufacture than device 100 as described herein. Since no custom-built printed circuit board is required for device 100, the manufacturing process is simplified. Furthermore, the printed circuit boards of conventional sensors and devices are susceptible to damage caused by dust, impact, and vibration—all of which are to be expected in a mechanical floor of a building or in a Materials Testing facility. Because the device 100 does not house a printed circuit board, and all processing is performed at the computer location, it is not nearly as susceptible to damage from these environmental factors.

Utilizing a basic suction cup 110 as the method for attachment to the beam 150, the devices 100 are very easy to attach and remove—even for a person with no training in any field related to the devices 100. Since the only operating components in the devices 100 are the lasers and their corresponding electrical wires, troubleshooting and maintenance are equally simple.

It is understood that the dimensions as detailed above are approximate and discs of various diameters and thicknesses can be utilized. It is further understood that while the shape of the disc is shown as being cylindrical, the device 100 can be any shape that is conducive for the used intended, e.g., cube, cuboid, triangular prism, etc. It is further understood that the cavity 120, 122, 124 and passageways 130, 132, 134 can be of various dimensions providing that sizes are appropriate for the uses intended.

While embodiments of devices for detecting beam deflection have been particularly shown and described with reference to the accompanying figures and specification, it should be understood however that other modifications thereto are of course possible; and all of them are intended to be within the true spirit and scope of novel and inventive systems, devices and methods described herein. Thus, configurations and designs of various features could be modified or altered depending upon particular embodiments.

It should also be appreciated that the exemplary embodiment or exemplary embodiments are only examples, and are not intended to limit the scope, applicability, or configuration of the subject matter hereof in any way. Rather, the foregoing detailed description will provide those skilled in the art with an enabling disclosure for implementing the exemplary embodiment or exemplary embodiments. It should be understood that various changes can be made in the function and arrangement of elements without departing from the scope of the subject matter hereof as set forth in the appended claims and the legal equivalents thereof.

The embodiments above are intended to be illustrative and not limiting. Additional embodiments are within the claims. Although the present subject matter has been described with reference to particular embodiments, those having skill in the art will recognize that changes may be made in form and detail without departing from the spirit and scope of the subject matter hereof.

The invention claimed is:

1. A sensor for measurement of deflection and/or bending moment in an object to which it is attached, said sensor comprising:

a receptacle body, the receptacle body further comprising a compact solid form defining three cavities, each one of the three cavities to house a laser where a beam of the laser is projected along 2D- and 3D-axes of the object to which it is attached and electrical wires to supply electricity to the lasers, the receptacle body implementing a vacuum system of attachment, wherein the receptacle body comprises a first side, a second side, a circumferential edge, and having a y-axis, an x-axis, and a z-axis;

one of the three cavities being a first cavity having a bottom surface and axially centered on the y-axis;

one of the three cavities being a second cavity having a bottom surface and axially centered on the x-axis;

a first passageway defined by the receptacle body, the first passageway axially centered on the y-axis and extendin from the bottom surface of the first cavity to a z-axis of the receptacle body;

a second passageway defined by the receptacle body, the second passageway axially centered on the x-axis and extending from the bottom surface of the second cavity to a z-axis of the receptacle body;

a third passageway defined by the receptacle body, the third passageway axially centered on the z-axis and extending from the first side so that the third passageway fluidly connects the third passageway, the second passageway and the first passageway at the z-axis;

a first laser disposed in the first cavity, the first laser comprised of a top end and a bottom end, the top end substantially even with the circumferential edge and the bottom end adjacent the bottom surface of the first cavity;

a second laser disposed in the second cavity, the second laser comprised of a top end and a bottom end, the top end substantially even with the circumferential edge and the bottom end adjacent the bottom surface of the second cavity; and wherein the electrical wires connect to the first laser and the second laser, the electrical wires traversing the first passageway and the second passageway and exiting the housing via the third passageway.

2. The sensor recited in claim 1 wherein the receptacle body implements an adhesive system of attachment.

3. The sensor recited in claim 1 wherein the receptacle body houses only 'X'- and 'Y'-axes lasers.

4. A beam deflection device comprising:
a cylindrical housing of a unitary solid material, the housing comprising a first side, a second side, a circumferential edge, and having a y-axis, an x-axis, and a z-axis;
a first cavity defined by the housing, the first cavity having a bottom surface and axially centered on the y-axis;
a second cavity defined by the housing, the second cavity having a bottom surface and axially centered on the x-axis;
a first passageway defined by the housing, the first passageway axially centered on the y-axis and extending from the bottom surface of the first cavity to a z-axis of the housing;
a second passageway defined by the housing, the second passageway axially centered on the x-axis and extending from the bottom surface of the second cavity to a z-axis of the housing;
a third passageway defined by the housing, the third passageway axially centered on the z-axis and extending from the first side so that the third passageway fluidly connects the third passageway, the second passageway and the first passageway at the z-axis;
a first laser disposed in the first cavity, the first laser comprised of a top end and a bottom end, the top end substantially even with the circumferential edge and the bottom end adjacent the bottom surface of the first cavity;
a second laser disposed in the second cavity, the second laser comprised of a top end and a bottom end, the top end substantially even with the circumferential edge and the bottom end adjacent the bottom surface of the second cavity; and
wiring connected to the first laser and the second laser, the wiring traversing the first passageway and the second passageway and exiting the housing via the third passageway.

5. The beam deflection device of claim 4, further comprising:
a third cavity defined by the housing, the third cavity having a bottom surface and axially centered on the z-axis, the bottom surface in communication with the third passageway;
a third laser disposed in the in the third cavity, the third laser comprised of a top end and a bottom end, the top end substantially even with the second side; and
wiring connected to the third laser, the wiring traversing the third passageway and exiting the housing via the third passageway.

6. The beam deflection device of claim 5, wherein the device is comprised of aluminum.

7. The beam deflection device of claim 5, further comprising a suction attachment device disposed on the second side.

8. The beam deflection device of claim 5, wherein the lasers each project a laser beam along a surface.

9. The beam deflection device of claim 5, wherein the wiring supplies power to the lasers and transmits information away from the lasers.

10. The beam deflection device of claim 5, further comprising an adhesive disposed on the second side.

11. The beam deflection device of claim 4, wherein the device is comprised of aluminum.

12. The beam deflection device of claim 4, further comprising a suction attachment device disposed on the second side.

13. The beam deflection device of claim 4, wherein the diameter of the passageways are less than the diameter of the cavities.

14. The beam deflection device of claim 4, wherein the lasers each project a laser beam along a surface.

15. The beam deflection device of claim 4, wherein the wiring supplies power to the lasers and transmits information away from the lasers.

16. The beam deflection device of claim 4, further comprising an adhesive disposed on the second side.

* * * * *